Patented Oct. 7, 1952

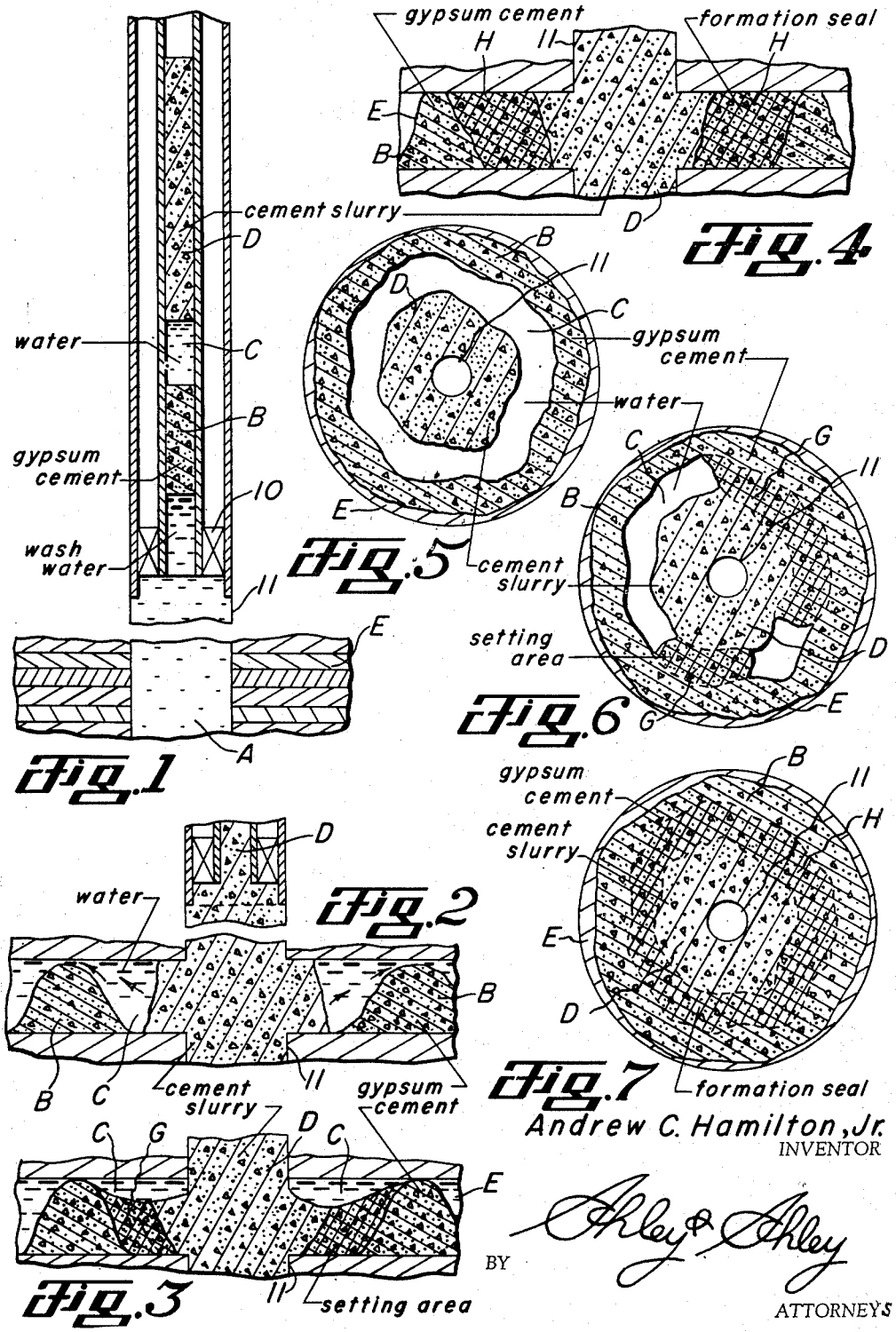

2,612,954

UNITED STATES PATENT OFFICE 2,612,954

METHOD OF SEALING OPENINGS IN WELL CASINGS AND EARTH FORMATIONS

Andrew C. Hamilton, Jr., Dallas, Tex.

Application September 10, 1948, Serial No. 48,768

10 Claims. (Cl. 166—22)

This invention relates to new and useful improvements in methods of sealing openings in well casing and earth formations.

One object of the invention is to provide an improved method of sealing openings in well casings and earth formations by accelerating the setting of cement in such manner as to quickly seal the openings with a minimum quantity of cement.

Another object of the invention is to provide an improved method, of the character described, wherein flash setting of the cement is caused by forcing the same into contact with an accelerating material to form a barrier against which unset cement may be squeezed so as to dehydrate and set the same.

A particular object of the invention is to provide an improved method, of the character described, wherein a slurry of calcined gypsum or gypsum cement is introduced into a well ahead of a slurry of cement and spaced therefrom to prevent premature setting, the cement slurry being permitted to contact the calcined gypsum slurry at or adjacent the openings to be sealed to accelerate setting of said gypsum slurry to form a barrier against which said cement slurry is squeezed to cause dehydration and flash setting of the same.

An important object of the invention is to provide an improved method, of the character described, which may be successfully employed at relatively high as well as low temperatures.

A further object of the invention is to provide an improved method of the character described, wherein water is employed to maintain the slurries in spaced relation and said slurries are pumped to the openings, the calcined gypsum slurry being forced through said openings and the pumps momentarily shut down to permit dissipation of the water and contacting of said slurries so as to cause immediate stiffening and subsequent setting of the cement irrespective of the temperature.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a schematic view showing a portion of a well bore and an earth formation pierced thereby, and showing the first step in carrying out this invention, Figs. 2, 3, and 4 are similar views showing the formation and subsequent steps in carrying out the invention, and Figs. 5, 6, and 7 are similar views taken in a horizontal plane across the formation being sealed, to illustrate the sealing action.

It is common practice in the oil industry to squeeze off water or loose or broken formations by pumping a cement slurry down the bore hole out through the perforations of the well casing or liner and/or into the formation. The setting of the cement forms a solid wall around the casing or a solid block in an open bore hole. If the slurry penetrates the formation without developing pressure in the bore hole, the pumps are stopped and said slurry is allowed to remain quiescent for a period of time. Subsequently, the pumps are stopped and started alternately until all of the slurry is displaced. If still no pressure is developed, the cementing operation is repeated after the cement in the formation has had sufficient time to set. Of course, the necessity for this delay or the staging of the cementing operation is due to the fact that the cement slurry will not plug the porous formation. Therefore, the cement is stopped to allow it to stiffen; however, it has been found that dehydration and flash setting of cement can be accomplished by forcing a cement slurry against a solid mass or other barrier so as to squeeze water out of the slurry. Since many formations are porous and have low pressure, the weight of the cement slurry causes the same to run out of the well pipe. In many cases it is difficult or almost impossible to obtain an adequate cement seal since the slurry continues to run into the formation before setting, and no barrier or plugging of the formation can be obtained.

The primary purpose of the present invention is to cause the cement to stop adjacent the casing or bore hole and then to dehydrate the same to bring about flash setting. The properties of calcined gypsum or gypsum cement make possible this invention. Calcined gypsum or gypsum cement can be made to set in a predetermined time and this setting time can be varied by the addition of accelerators or retarders when mixing the calcined gypsum with water at the surface. Due to its special seeding action, continued mixing causes the calcined gypsum to set faster. Since calcined gypsum will set in motion and since cement and calcined gypsum are mutual accelerators for one another, the bringing of the two together results in flash setting at the interface between the two slurries. When the cement is forced against the barrier thus formed by the gypsum and cement, said cement is dehydrated and will flash set.

In carrying out the present invention, a conventional squeeze packer or tool 10 is run into a well or bore 11 on tubing or drill pipe 12 and set in the usual manner. Water A is first pumped into the tubing to clean the same and is followed by an accelerating material, such as calcined gypsum or gypsum cement, in the form of a slurry B and having a predetermined setting time. It is imperative that the setting time be known so that the gypsum slurry has ample time to travel the length of the tubing and be forced therefrom. Although the slurry may be of any desired consistency, the heavier or thicker it is the better it functions and a heavy, viscous slurry, 12 to 15 pounds per gallon, has been found to be very satisfactory. In some instances, a thin slurry might be used. A relatively small quantity of water C, such as one or two barrels, is then pumped into the tubing immediately behind the gypsum slurry and is followed by a predetermined quantity D of Portland cement in slurry form of desired consistency.

These slurries are pumped down the tubing and are maintained in spaced relation by the water interposed therebetween, as shown in Fig. 1, to prevent premature contact and setting of said slurries. When the openings to be sealed off are reached, the gypsum slurry as well as the water ahead and behind it and part of the cement slurry is pumped into and through the same, as shown in Fig. 2. Then, the pumps are shut down for a few moments to permit dissipation of the water, especially the intervening water, indicated by the arrows in Fig. 2, whereby the cement moves toward the gypsum slurry. While the slurries are substantially stationary or quiescent, the same will commence to stiffen or jell. Pressure is restored by again starting the pumps so as to complete the dissipation of the water and to force the cement against the gypsum slurry, thereby causing a flash set at the interface between said cement and slurry (Fig. 3). This immediately forms a barrier against which the unset cement is squeezed so as to dehydrate and set the latter (Fig. 4). The gypsum, having stiffened, begins to resist movement through the formation and its setting is accelerated by contact with the cement. In fact, this contact results in a flash set of the gypsum which forms a barrier or filter, against which the cement is squeezed, thereby dehydrating said cement and causing a flash set of the same. Thus, the barrier is increased and the following cement is squeezed thereagainst so as to dehydrate and flash set the same. Since the gypsum is capable of setting while in motion, the stopping of the pumps is primarily to permit dissipation of the water.

The invention perhaps may be more fully understood by a consideration of Figs. 5 through 7, keeping in mind that these figures are a rather simplified and diagrammatic illustration of the action of the slurries in the formation being sealed, and are taken in a horizontal plane with the well bore as a center in order to show the movement and functions of the two slurries. As shown in Fig. 5, the gypsum slurry B enters the formation and spreads radially therein. An earth formation, regardless of its porosity, is normally not uniform in nature, and the slurry will flow more easily through portions thereof than it will through other portions at the same elevation. Hence, the slurry will not form a perfectly circular ring or annulus around the well bore 11 and in the formation E, but will form a somewhat irregular enclosing configuration as shown in Fig. 5. The body of water C also enters the formation and a portion of the cement slurry B. At this point, the pumps are shut down and the water permitted to dissipate by escaping into the formation as by flowing over the upper portion of the gypsum slurry B, as shown in Fig. 2, or otherwise migrating into the formation.

Now, as the pumps are again started, the last of the water C is dissipated and the cement D begins to move into the contact with the gypsum slurry B. Here again, there will not be uniform radial flow since the slurry is a fluid and will follow the path of least resistance. As the cement slurry moves into contact with the gypsum slurry at various points, however, a flash setting or gelling at these points of contact will occur with the result that the slurries in that immediate locality spontaneously stiffen to a marked degree so as to increase greatly the resistance to flow. The areas G in which this stiffening has occurred are designated in the drawing as "setting area." This increased back pressure or resistance will cause the cement slurry D to flow in other more permeable paths through the formation into contact with the other portions of the gypsum cement slurry B, and this action continues until the cement slurry B has been forced into contact with the gypsum slurry entirely around the well bore. Further, the slurries may tend to slump somewhat in the formation, and this initial stiffening action may begin at the lower portions of the formation and work progressively upwardly, as illustrated in Figs. 3 and 4. At any point as the cement slurry D comes into engagement with the gypsum slurry B, a stiffening, gelling, or flash setting takes place, and the cement slurry, under the impetus of the pumps, seeks other passages of egress. In so doing, the cement flows into engagement with other portions of the ring of gypsum slurry surrounding the well bore, and a barrier or formation seal H is rapidly built up which completely encircles the well bore and blocks the formation, as shown in Figs. 4 and 7.

When this barrier is complete, and probably at isolated points, even before the barrier is complete, the outward flow of the cement slurry D is halted, causing the pumps to build up a pressure thereon. This pressure dehydrates the cement slurry or squeezes the water therefrom, causing the entire slurry to flash set and form the desired plug or seal of the formation E.

If desired, the calcined gypsum slurry may be followed by a mixture of Portland cement and a water soluble thermo-setting resin. This would have the advantage of the resin leaving or being forced ahead of the cement with the water present therein and entering the minute openings of the formation when the pumps are started, after being shut down, for forcing the mixture against the gypsum. Due to the temperature in the hole, the resin sets and seals such openings to completely close off the formation.

If the formation is so porous or loose that a satisfactory seal is not obtained, the pumps are stopped long enough to permit setting of the calcined gypsum in the pores of said formation. The latter is thereby more or less solidified and the cement is squeezed thereagainst. In the event that the formation is extremely porous, a small quantity or slurry of rapid setting calcined gypsum is run immediately ahead of a calcined gypsum slurry requiring a greater time to set. For example, the first slurry may require thirty minutes to set and the second, one hour. Both of these gypsum slurries are forced out into the porous formation and the pumps are shut down until the rapid setting slurry sets. Upon such setting, the water between the gypsum and cement slurries has escaped or become dissipated and the slower setting gypsum, when contacted by the cement, is accelerated and flash sets to form a sufficient barrier for causing dehydration and flash setting of said cement. Thus, a positive barrier is formed and causes dehydrating of the unset cement which sets and seals the openings of the well casing or earth formation.

When attempting to seal off such openings, it has been common practice to spot a plug of quick setting gypsum. If this did not form a seal, cement or additional calcined gypsum was forced against the plug until a complete seal was obtained. Not only were materials wasted but also this procedure could be used only at lower temperatures since the gypsum would not set at temperatures above 140° to 160°. The temperature in the hole, however, has little bearing on the present method which has its basis founded on the proposition that, although calcined gypsum will not set at high temperatures, it will still accelerate the setting of cement and quickly stiffen a slurry of the latter.

A small quantity of calcined gypsum is mixed with water to form the slurry B and is introduced into the tubing or drill pipe, being followed by two or three barrels of water C. Also, water A is run ahead of the gypsum slurry to clean the tubing and prevent contamination of said gypsum. Then, the required amount of cement D, in slurry form is pumped into the tubing. As set forth hereinbefore, the water between the slurries maintains the same a safe distance apart so as to avoid contacting and flash setting of said slurries. These materials are pumped down through the tubing in a continuous column until all of the water and calcined gypsum have been forced out of the casing and/or into the formation, at which time, the pumps are shut down for a few moments. This allows the water C to escape or dissipate into the pores or openings of the formation and the cement D to move into contact with the calcined gypsum B.

Upon starting of the pumps, the cement is forced against the calcined gypsum causing an immediate stiffening of said gypsum. As the gypsum commences to stiffen, a thick or viscous slug or barrier is formed which tends to lodge within and fill the openings or pores of the formation and which will not penetrate or escape therethrough. The continued application of pressure dehydrates the cement and results in setting of the same. The cement behind this slug or barrier is forced into other openings where it comes into contact with the calcined gypsum, thereby causing said cement to dehydrate and set so as to close or seal said openings which may be in either the casing or the formation. Thus, the desired pressure for a successful squeeze operation is obtained.

The foregoing description of the invention is explanatory thereof and various changes in the steps of the method may be made, so long as within the scope of the appended claims, without departing from the spirit of the invention.

What I claim and desire to secure by Letters Patent is:

1. The method of sealing an earth formation which includes depositing a body of calcined gypsum cement slurry into a well tubing, then depositing a body of separating liquid into the well tubing, then depositing a body of Portland cement, applying pressure to said bodies so as to force the gypsum slurry and liquid into the earth formation, allowing the separating liquid to move from between the gypsum and Portland cement slurries, and forcing the Portland cement slurry into contact with the gypsum cement slurry in the formation.

2. The method of sealing an earth formation which includes depositing a body of calcined gypsum cement slurry into a well tubing, then depositing a body of separating liquid into the well tubing, then depositing a body of Portland cement, applying pressure to said bodies so as to force the gypsum slurry and liquid and at least a portion of Portland cement into the earth formation, allowing the separating liquid to move from between the gypsum and Portland cement slurries, and forcing the Portland cement slurry into contact with the gypsum cement slurry in the formation.

3. The method of sealing an earth formation which includes depositing a body of calcined gypsum cement slurry into a well tubing, then depositing a body of separating liquid into the well tubing, then depositing a body of Portland cement, applying pressure to said bodies so as to force the gypsum slurry and liquid into the earth formation, relieving the applied pressure to allow the separating liquid to move from between the gypsum and Portland cement slurries, and forcing the Portland cement slurry into contact with the gypsum cement slurry in the formation.

4. The method of sealing an earth formation which includes depositing a body of calcined gypsum cement slurry into a well tubing, then depositing a body of separating liquid into the well tubing, then depositing a body of Portland cement, applying pressure to said bodies so as to force the gypsum slurry and liquid to move from between the gypsum and Portland cement slurries, forcing the Portland cement slurry into contact with the gypsum cement slurry in the formation, and continuing the application of pressure to the Portland cement slurry to dehydrate the same and cause it to flash set.

5. The method set forth in claim 2, for use in loose formations which includes the step of introducing a quick-setting calcined gypsum slurry, forcing both gypsum slurries into the formation, relieving the pressure sufficiently long to permit setting of the quick setting gypsum slurry, thereby forming a barrier against which the slower setting gypsum slurry and the cement slurry may be forced into contact to cause flash setting upon resumption of the pressure, and resuming the application of pressure to force the latter slurries into contact against the barrier.

6. The method set forth in claim 4, including, mixing a water soluble thermo-setting resin with the Portland cement slurry whereby the resin moves ahead of said cement slurry and enters the pores of the formation when the pressure is restored and the mixture is forced into contact with the gypsum cement slurry.

7. The method as set forth in claim 1, wherein the gypsum cement slurry has a predetermined time of set in slight excess of the time required for introduction of the same into the tubing and forcing into the earth formation.

8. The method of sealing an earth formation which includes depositing a body of calcined gypsum cement slurry into a well tubing, then depositing a body of water into the well tubing, then depositing a body of Portland cement, applying pressure to said bodies so as to force the gypsum slurry and water into the earth formation, allowing the water to move from between the gypsum and Portland cement slurries, and forcing the Portland cement slurry into contact with the gypsum cement slurry in the formation.

9. The method of sealing an earth formation which includes depositing a body of calcined gypsum cement slurry into a well tubing, then depositing a body of water into the well tubing, then depositing a body of Portland cement, applying pressure to said bodies so as to force the gypsum slurry and water and at least a portion of the Portland cement into the earth formation, allowing the water to move from between the gypsum and Portland cement slurries, and forcing the Portland cement slurry into contact with the gypsum cement slurry in the formation.

10. The method of sealing a subsurface break in a well or opening in the earth which includes, introducing a slurry of calcined gypsum cement with a predetermined setting time into the opening, introducing a Portland cement slurry into said opening following the calcined gypsum cement slurry, interposing a sufficient quantity of water between the slurries to space the same a safe distance apart and prevent a premature flash set, forcing the spaced slurries in a substantially continuous stream downwardly in said opening under pressure until said gypsum cement slurry and water enter the break, momentarily relieving the pressure to allow the water to escape from between the slurries, and forcing said Portland cement slurry into contact with said gypsum cement slurry to cause stiffening of the latter whereby a barrier is formed against which the former may be squeezed so as to cause dehydrating and flash setting thereof.

ANDREW C. HAMILTON, JR.

REFERENCES CITED

The following references are of record in the file of this patent:

UNITED STATES PATENTS

| Number | Name | Date |
| --- | --- | --- |
| 2,075,882 | Brantly | Apr. 6, 1937 |
| 2,168,735 | Gilstrap | Aug. 8, 1939 |
| 2,191,652 | Hamilton, Jr. | Feb. 27, 1940 |
| 2,206,389 | Cannon | July 2, 1940 |
| 2,236,987 | Bechtold | Apr. 1, 1941 |
| 2,249,511 | Westall | July 15, 1941 |
| 2,274,297 | Irons et al. | Feb. 24, 1942 |

OTHER REFERENCES

"The Chemistry of Cement and Concrete" by F. M. Lea and C. H. Desch, published in 1935 by Erward Arnold & Co., London, pages 187 and 188.